May 23, 1933. J. HAHN 1,910,387
SHEARING APPARATUS
Filed Dec. 14, 1931  5 Sheets-Sheet 1

WITNESSES
INVENTOR
Johann Hahn
by Brown & Critchlow
his attorneys

May 23, 1933.  J. HAHN  1,910,387

SHEARING APPARATUS

Filed Dec. 14, 1931   5 Sheets-Sheet 4

WITNESSES

INVENTOR
Johann Hahn
by Brown & Critchlow
his attorneys

Patented May 23, 1933

1,910,387

UNITED STATES PATENT OFFICE

JOHANN HAHN, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

SHEARING APPARATUS

Application filed December 14, 1931. Serial No. 580,766.

This invention relates to apparatus for cutting moving stock into sections of predetermined lengths, and more particularly to a flying shear of the rotary type adapted for cutting of metal strip and like materials.

The primary object of the invention generally stated is to provide an improved form of rotary shear which may be easily and readily adjusted to vary the length of cuts which it produces in any amounts desired and at any time independently of whether the apparatus is idle or in motion.

A particular object is to provide in a shear of this character for varying the diameter of the path of travel of the cutting blades to vary the lengths of the cuts and for also adjusting the cutting blades in such a way as to cause them to either miss or make cuts as the carriers upon which they are mounted are rotated and for doing so when they are in motion as well as when they are idle.

Another object is to provide for positively synchronizing the speed of the strip being fed to the shear with the speed of the cutting blades so as to positively insure the cuts being made in precise and accurate lengths.

A further object is to provide for positively driving both the shear and its feeding mechanism from a common source of power and for simultaneously and automatically adjusting the feeding mechanism whenever the shear is adjusted and for accomplishing such end without the aid of the usual complicated driving connections.

These and numerous other objects as well as the various other novel features and advantages of the invention will be apparent when the following detailed description is read in conjunction with the accompanying drawings wherein.

Figure 1:
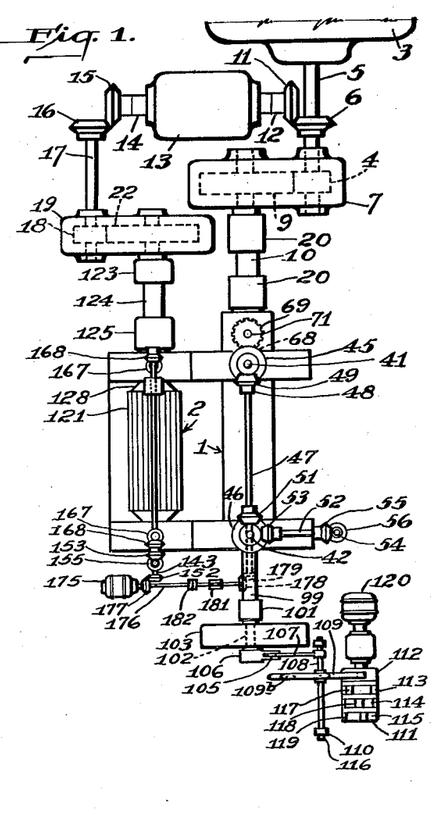
Fig. 1 is a plan view of a combined feeding and shearing apparatus constructed in accordance with the invention.

Referring to the drawings and particularly Fig. 1, the numeral 1 designates the shear proper and the numeral 2 the feed roll unit. For operating both of these a single driving motor 3 is provided, being provided with a pinion gear 4 on its drive shaft 5 for driving the shear and a bevel gear 6 for driving the feed rolls. The first-mentioned of these gears is disposed in a housing 7 and arranged to engage the lower of two vertically aligned meshing gears 8 and 9 which are in turn coupled to the blade carriers of the shear. The other gear 6 is arranged to engage a cooperating bevel gear 11 mounted on a shaft 12 that is extended into a change gear unit 13 from which shaft 14 is projected. This latter shaft carries a bevel gear 15 which is arranged to engage a cooperating gear 16 mounted on a shaft 17 which carries a pinion gear 18 at its opposite end. The latter gear, like gear 4, is disposed in a housing 19 to engage the lower of a pair of vertically aligned meshing gears 21 and 22 employed for operating the feed rolls.

Referring now in detail to the shear proper as illustrated more particularly in Figs. 2 to 7 inclusive, the numerals 23 and 23' designate generally a pair of blade carriers which are mounted for rotation in a supporting frame 24. Because of the likeness of these carriers, and to simplify this description, only one of them will be described in detail the corresponding parts of the other being designated by the same reference characters primed. As shown each comprises a drum-like frame structure 25 having hub portions 26 and 27 at its opposite ends which are supported in suitable bearings 28 and 29 that are in turn mounted for vertical adjustment in guideways 31 and 32 formed in the end walls 33 and 34 of frame 24.

On the carrier there is provided a cutter blade or knife 35 which is mounted upon a rotor 36 that is rotatably supported in the arms 30 of a substantially Y-shaped element 37 the stem 38 of which is slidably engaged in an opening 39 extended through the center of the drum.

Figures 3, 4:
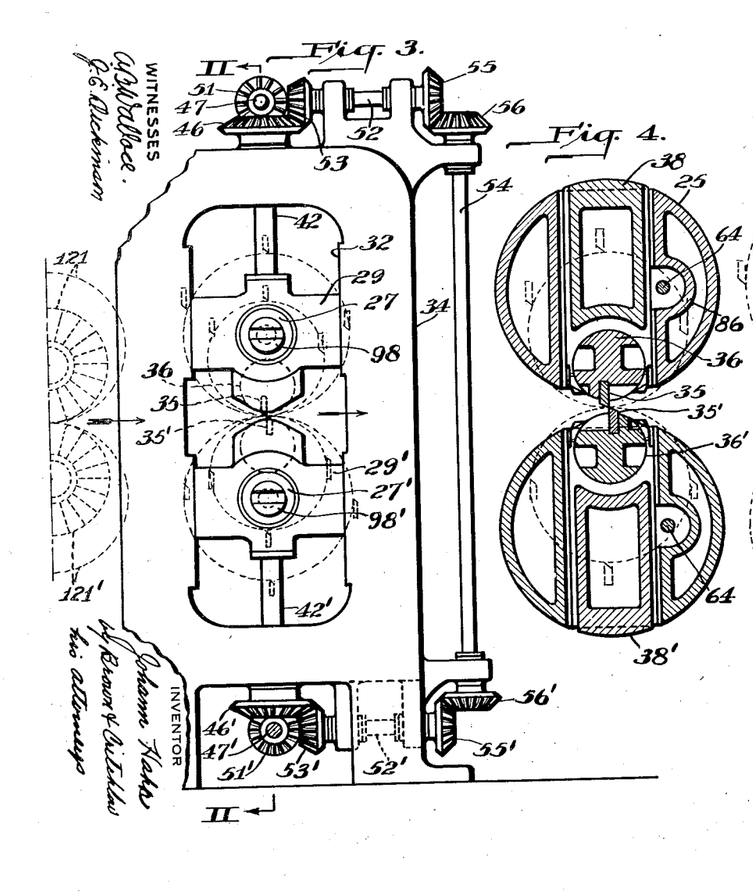
Fig. 3 an end view of the shear.
Figs. 4 and 5 sectional views respectively of the blade carriers taken on the line IV—IV of Fig. 2 showing the carriers adjusted to make cuts of different lengths.
Figure 5:
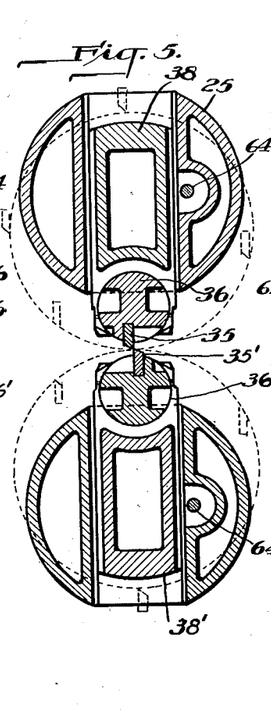
Figure 6:
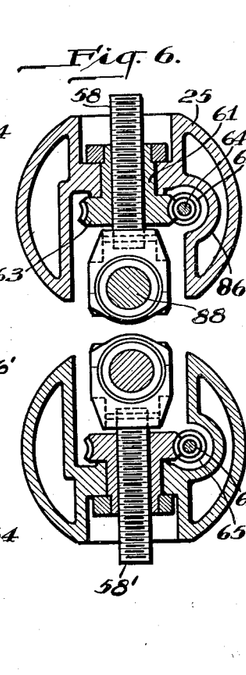
Fig. 6 another sectional view of the blade carrier taken on the line VI—VI of Fig. 2.

In accordance with the invention, the material to be sectioned is preferably fed between the blade carriers at a linear speed corresponding to the peripheral speed of blades 35 and 35', and to provide for varying the lengths of the cuts, provision is made for varying the diameter of the path of rotation of the blades. It is for this purpose that bearings 28 and 29 and 28' and 29' which support carriers 23 and 23' are mounted for vertical movement in guideways 31 and 32 and the blade rotor mounted on radially adjustable elements 37 and 37'. As will be understood and as shown in Figs. 4 and 5, when elements 37 and 37' are adjusted, carriers 23 and 23' must be adjusted with respect to each other a corresponding amount to provide the proper cutting opposition of the blades.

To provide for making these adjustments bearings 28 and 29 are supported in frame 24 by screws 41 and 42. These in turn are rotatably supported in internally threaded sleeves 43 and 44, respectively, which are rotatably mounted in end walls 33 and 34 at the ends of guideways 31 and 32, being held therein against relative vertical movement therewith. Hence when sleeves 43 and 44 are rotated, bearings 28 and 29 are moved. For turning these sleeves, a pair of bevel gears 45 and 46, respectively, are keyed to their outer ends, and to turn both simultaneously so as to adjust both ends of the carrier at the same time and the same amount they are tied together by a shaft 47 mounted in brackets 48 which carries gears 49 and 51 on its opposite ends that engage gears 45 and 46 respectively. For adjusting both carriers at the same time, as shown in Fig. 3, horizontal shafts 52 and 52' are provided at the top and bottom of the shear, and these are connected to gears 45 and 46 by gears 53 and 53' and together by a vertical shaft 54 and gears 55 and 56 and 55' and 56'. To permit such adjustment of carriers 23 and 23' gears 8 and 9 are flexibly connected to them by means of shafts 10 and 10' which are engaged at their opposite ends in universal joints 20 and 20'.

To provide for radially adjusting blade-supporting rotor 36 in carrier 23, a pair of screws 57 and 58 are attached to arms 30 of the Y-shaped element 37 and extended through a pair of threaded sleeves 59 and 61 which are rotatably secured in drum 23. For turning these sleeves worm gears 62 and 63 respectively are provided on their one end and these are engaged with a pair of worms 65 and 66, see Fig. 6, which are mounted on a shaft 64 that is extended into hub 26 and equipped with a gear 67 by which the two screws are simultaneously adjusted.

Figure 2:
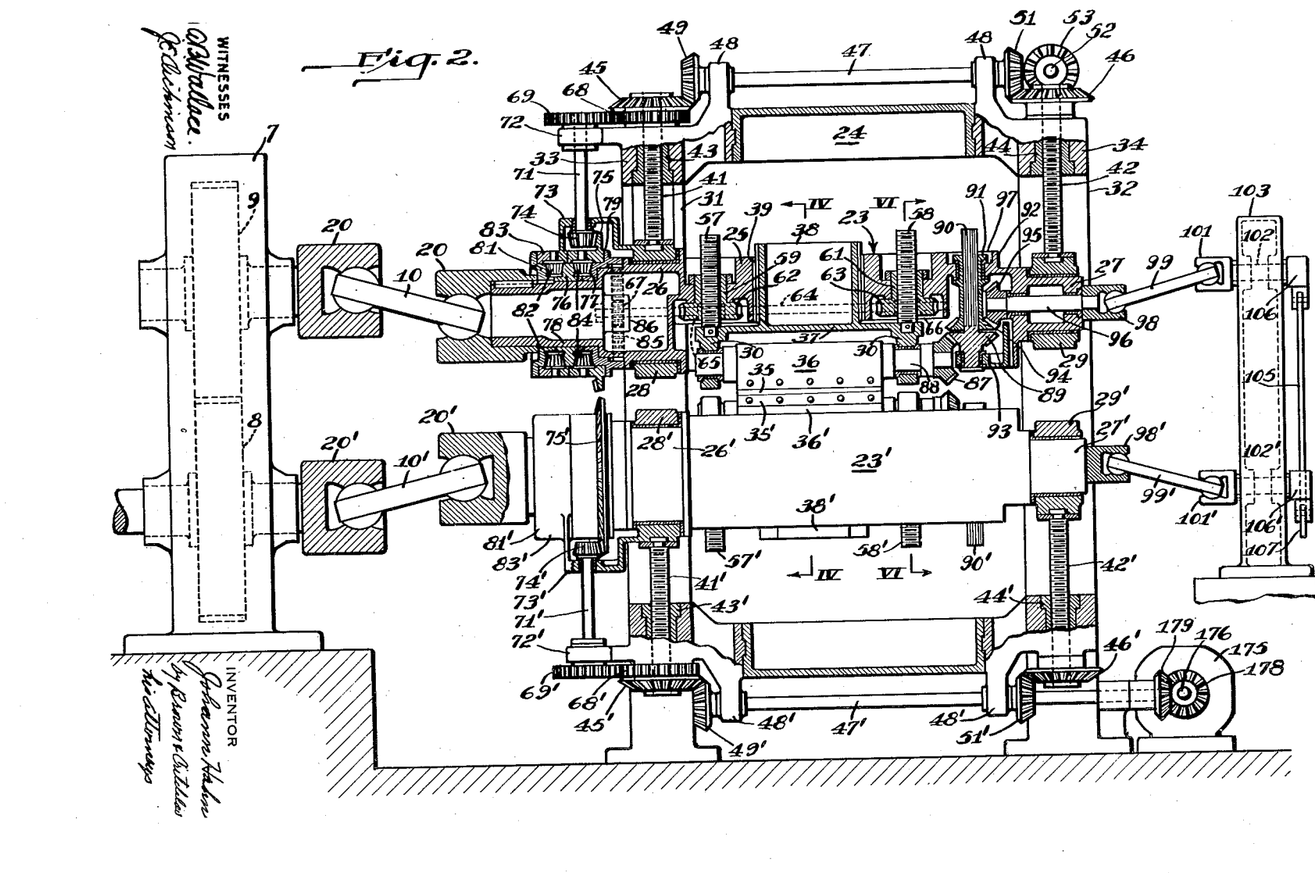
Fig. 2 a sectional view of the shear proper taken on the line II—II of Fig. 3 except for the showing of the lower blade carrier and blade-adjusting mechanism which are shown in elevation.
Figure 7:
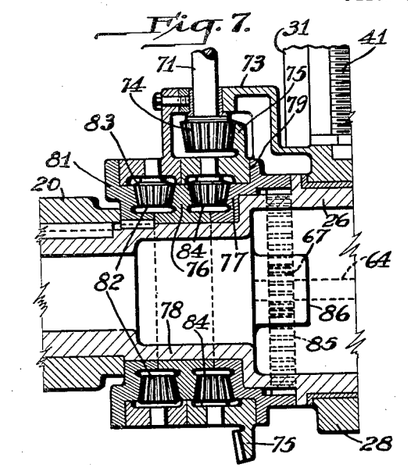
Fig. 7 a sectional view to enlarged scale of the driving mechanism employed for adjusting the blade supporting rotors in the blade carriers.
Figure 8:
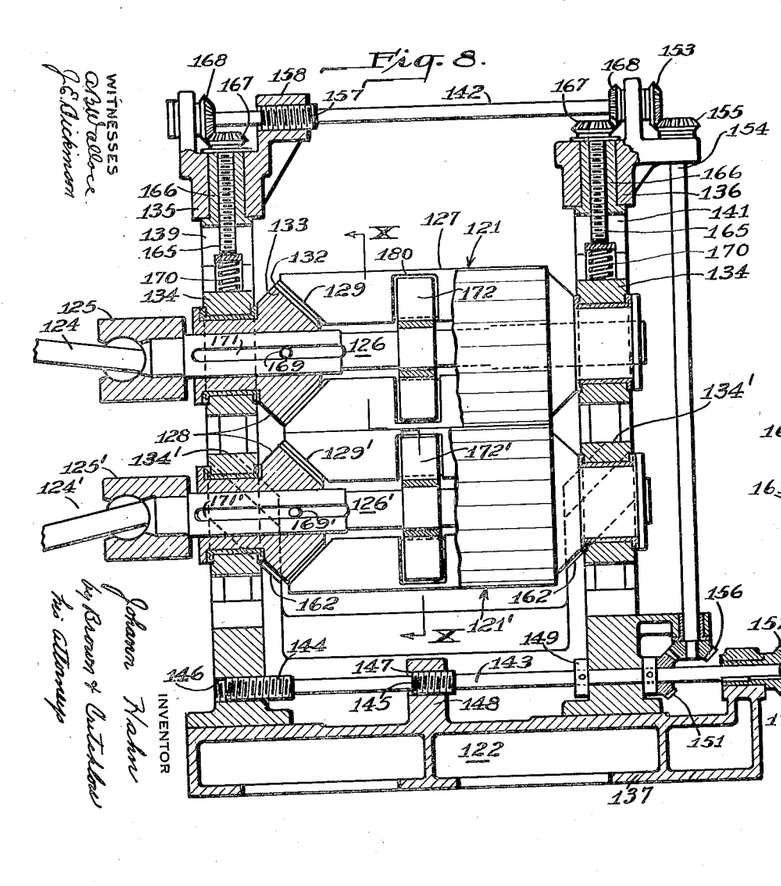
Fig. 8 a longitudinal sectional view of the pinch or feed roll unit taken on the line VIII—VIII of Fig. 9 except for one end of the rolls which is shown in elevation.
Figure 9:
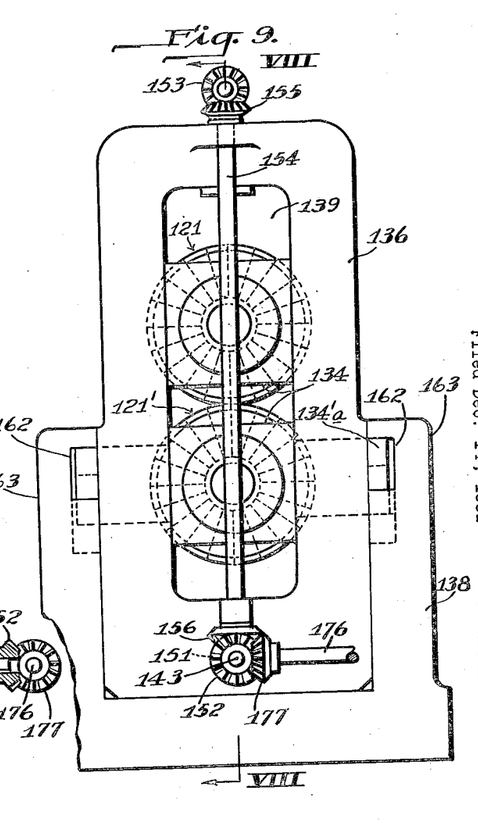
Fig. 9 an end view of the feed roll unit.
Figures 10, 11:
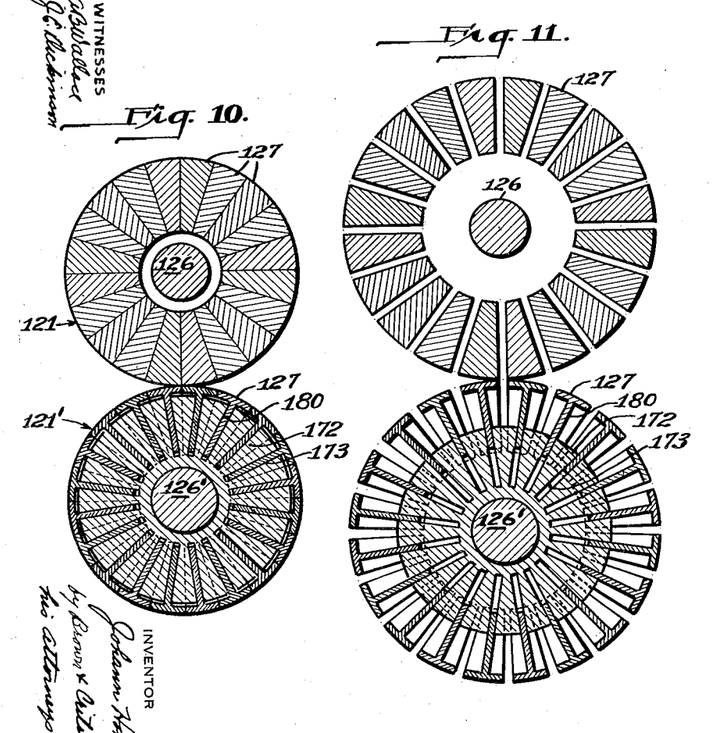
Figs. 10 and 11 sectional views respectively of the feed rolls taken on the line X—X of Fig. 8 and showing the rolls adjusted to positions corresponding to the positions of the blade carriers shown in Figs. 4 and 5.
Figure 12:
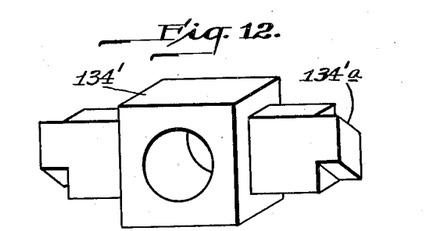
Fig. 12 a perspective view of one of the bearings on the lower feed rolls.

For effecting the adjustment of screws 57 and 58 simultaneously with the adjustment of screws 41 and 42, as shown particularly in Figs. 2 and 7, a gear 68 is keyed to the driving end of sleeve 43 and meshed with a cooperating gear 69 mounted on one end of a shaft 71 which is supported in a bearing 72 provided on frame 24 and a bearing 73 which constitutes an integral part of bearing 28. The opposite end of the shaft is equipped with a bevel gear pinion 74 which is arranged to mesh with a beveled ring gear 75 that is mounted loosely on the periphery of a double-faced beveled ring gear 76 and a single-faced beveled gear 77 both of which are loosely mounted on a reduced portion 78 of hub 26. The inner end of gear 77 is so formed as to engage an annular shoulder 79 provided on the hub of gear 75 to prevent axial movement thereof. Adjacent to gear 76 there is mounted another ring shaped beveled gear 81 which is keyed to the reduced portion of hub 26. Between this latter gear and the outer gear face of gear 76 there are arranged in spaced relation about the periphery thereof a plurality of pinions 82 which are mounted in a ring support 83 attached to bracket 73. A similar group of pinions 84 are mounted between the inner face of gear 76 and gear 77 and these supported on stub shafts in the hub of gear 75. On the inner end and inner face of the hub of ring gear 77 there is formed an internal gear 85. This meshes with gear 67 which projects through an opening 86 in hub 26.

In accordance with this construction under normal operation gear 74 stands idle being engaged to gear 68 on sleeve 43 and gear 81 which is keyed to hub 26 of carrier 23 is rotated. Consequently, through the agency of pinions 82 gear 76 is rotated in the opposite direction to that of the carrier. This in turn through the agency of pinions 84 which are held against rotation about hub 26 by gear 75 being in engagement with pinion 74 causes gear 77 to rotate in the same direction as the carrier, hence causing gear 85 to rotate with gear 67. Because of this no relative movement takes place between gears 85 and 67. Consequently, shaft 64 is not turned. However, if sleeves 43 and 43' are turned, gears 74 and 75 are set in motion and independently of whether drums 23 and 23' are standing still or in motion a relative movement is produced between gears 75, 76 and 77. This relative movement in turn produces a relative movement between gears 85 and 67 causing shaft 64 to be turned and with it sleeves 59 and 61 which move screws 57 and 58 and adjust the rotor support 37. The direction of such adjustment is of course determined by the direction of rotation of sleeves 43 and 43' and the amount of such adjustment corresponds to that of the sleeves the gear ratios used being such as to bring about this desired result.

The limits and variations in lengths of cut which can be produced by the shear each time the carriers are rotated are determined by the minimum and maximum radius of rotation which can be imparted to the cutting blades by adjustment of the blade carriers and the blade-supporting elements as set forth above. To further enlarge upon these limits, however, means are provided for rotating the blade rotors 36 to the end that they may be caused to make or miss cuts as the carriers are rotated, at the will of the operator, thus making it possible to make any length of cut desired above that determined by the minimum obtainable radius of rotation which can be given to the cutting blades. To provide for this a bevel gear 87 is mounted on one end of axis 88 of rotor 36 and arranged to mesh with a cooperating gear 89 which is keyed to a splined shaft 91 mounted in a bearing 92 in drum 23 and a bearing 93 secured to element 37 the latter bearing being adapted to hold shaft 91 against endwise movement relative to rotor 36, hence always holding gears 87 and 89 together. On splined shaft 91 in back-to-back relationship with gear 89 there is provided a gear 94 which is arranged to mesh with a cooperating gear 95 mounted on a shaft 96 that is extended through the end of hub 27. To permit relative radial movement between rotor 36 and drum 23 and at the same time insure the maintenance of operative engagement between gears 94 and 95, end 90 of the hub 97 of gear 94 which is made in elongate form for such purpose is mounted in and is held against endwise movement with respect to carrier 23 by bearing 92.

Through this arrangement when shaft 96 is held at a standstill as it normally is, rotor 36, due to gears 87, 89, 94 and 95 all being of the same size, is caused to make one complete revolution about its axis of rotation each time the drum 23 rotates. This causes the cutting blades to always lie in a vertical plane as shown by the dotted lines in Figs. 3, 4 and 5, when adjusted for cutting, thus having the advantage that they are always perpendicular to the stock before and after as well as when the cut is made which best makes for proper cutting as is well known. However, by rotating shaft 96 rotors 36 and 36' may be rotated in a manner to cause them to either miss or make cuts, as desired by the operator.

Figure 16:
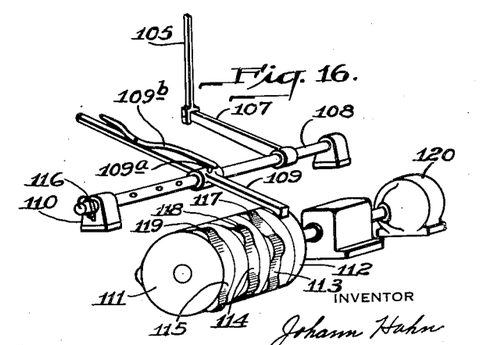

Obviously from the foregoing any length of cut whatever above the minimum determined by the minimum radius of the shear may be obtained by merely adjusting screws 41 and 42 and controlling periods at which blades 35 and 35' will come together as the carriers are rotated. For effecting such control of the blades different forms of control means may be employed. In the present embodiment, as shown in Figs. 1, 2, and 16, a control for this purpose is provided which consists of a pair of shafts 99 and 99' which are connected by universal joints 101 and 101' to a pair of stub shafts 102 and 102' that are rotatably mounted in suitably spaced relation in a supporting frame 103. To move both blades at the same time these shafts are connected by a connecting rod 105 pivotally connected to a pair of levers 106 and 106' mounted on shafts 102 and 102'. To the lower end of rod 105 there is connected a lever 107 which is keyed to a shaft 108. On this latter shaft a suitable rocker arm 109 is splined for axial movement and arranged to engage a cam drum 111. This drum is driven at a speed which is a multiple of the speed of the cutting drums or blade carriers and in synchronism therewith. Any suitable power unit is employed for this purpose such for example as a synchronous motor 120 connected to operate in synchronism with motor 3. In the construction shown drum 111 is connected to be driven at one-twelfth the speed of drums 23 and 23' and is equipped with four cam rings 112, 113, 114 and 115. Cam 112 is a plain annular band which does not produce any movement of the rocker arm 109, it being adapted to support the rocker arm in a position to produce a cut each time drums 23 and 23' are rotated. The rocker arm 109 which is adjustably connected to shaft 108 by a pin 109a connected to a clamp 109b is held against this cam as well as the others which are adjusted to engage them by a spring 116 that is connected to shaft 108 at one end and at the other to one of the brackets 110 in which the shaft is mounted. Cam 113 is provided with six equally spaced lugs 117 which are so arranged as to cause the blades and rotor 36 to be rotated sufficiently and at such time on every other revolution of the blade carrier as to cause the blade to miss making a cut. Cam bands 114 and 115 differ from band 113 only in that they are equipped with four and three lugs 118 and 119, respectively, instead of six. Hence when rocker arm 109 is arranged to engage these bands it controls the shear in such a way that cuts are produced on only every third or fourth revolution of the carriers. The range of such a control may of course be further amplified by merely increasing the speed ratio between the blade carriers and the cam drum and increasing the number of cam bands and cam lugs on the drum.

With flying shears of this character it is necessary for proper cutting operations that the linear speed of the stock and the peripheral seed of the cutting blades be the same, and that for accurate cutting that the relative speeds of the stock and blades be maintained constantly uniform. In accordance with this invention a novel feeding means is provided for accomplishing such end. This, as illustrated more particularly in Figs. 1 and 8 to 14, respectively, comprises a pair of expansible feed rolls 121 and 121' which are suitably mounted for rotation in a frame 122 and driven by gears 21 and 22, the connection between them and the gears being made by universal joints 123 and 123', shafts 124 and 124' and universal joints 125 and 125'.

Figure 13:
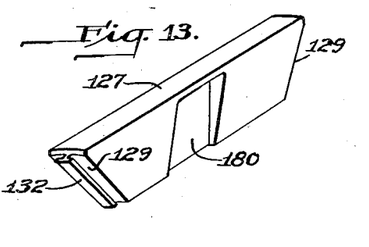
Fig. 13 a perspective view of one of the segmental surface sections of the feed rolls.
Figure 14:
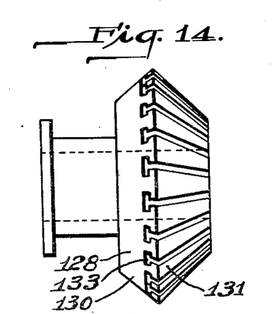
Fig. 14 a perspective view of a feed roll end block.
Figure 15:
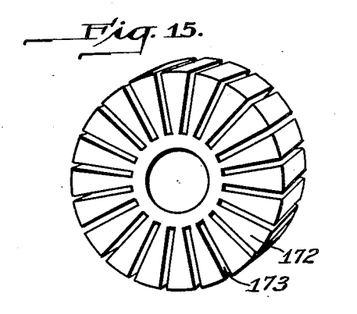
Fig. 15 a perspective view of a driving cog mounted on the roll shaft and Fig. 16 a perspective view of the blade controlling mechanism.

Like the blade carriers referred to above, because of their similarity and to simplify the description, only one of these rolls is described in detail, the parts of the other being designated by similar reference characters primed. As shown each comprises a shaft or axis 126, on which a plurality of roll-forming wedge-shaped radially movable segmental sections 127 and a pair of axially movable tapered end sections 128 are mounted. To provide for their adjustment the ends 129 of sections 127 are tapered inwardly, and end sections 128 which engage them are likewise tapered at 130 and preferably on an angle of 45°. To hold the sections of the roll together each segment section is provided at each of its ends with an interlocking tongue 132 which is adapted to slidably fit into a receiving groove 133 cut in the face of the adjacent end section 128 as shown in Figs. 13 and 14. With such a construction, through the adjustment of the end blocks 128 which are slidably mounted on the axes 126 and 126', the radius of the feed rolls can be varied between limits determined by the radius of the end blocks and in a manner quite similar to the cutter blades. Hence, when driven in synchronism with the blade carriers if adjusted simultaneously therewith the relative speeds of the stock moved by the rolls and the blades may be maintained in positive synchronism.

To provide for varying the diameters of rolls 121 and 121', end walls 135 and 136 of frame 122 in which the rolls are supported are mounted for movement upon a base 137, the end blocks 128 of the rolls being held in bearings 134 which are adjustably mounted for vertical movement in guideways 139 and 141 provided in walls 135 and 136. Hence by moving the walls 135 and 136 toward or away from each other the rolls may be expanded or contracted, and for effecting such movement screw shafts 142 and 143 are provided. These are located in the upper and lower ends respectively of walls 135 and 136. The lower of these is provided with two screw sections 144 and 145, which are engaged in a threaded opening 146 in wall 135 and a threaded opening 147 in a projection 148 provided on base 137 midway between the two walls. A suitable band or stop 149 is mounted on this shaft next to the inner side of wall 135 to move the latter wall in an endwise direction when the screw is moved, and a beveled driving gear 151 is keyed on the other side of said wall for driving the upper screw shaft and for also assisting in moving the end wall 136. Differing from shaft 143 shaft 142 is secured at one end in wall 135 and provided with a single thread portion 157 which is threadably engaged in a projection 158 of wall 135. For turning both shafts 142 and 143 simultaneously a gear 151 is keyed to shaft 143 and connected by a shaft 154 and gears 155 and 156 with a gear 153 keyed to shaft 142. When shaft 143 is turned screw sections 144 and 145 are threaded into or out of openings 146 and 147, respectively, depending on their direction of rotation, and cause walls 135 and 136 to either move toward or away from each other, thereby moving blocks 128 and 128' to enlarge or reduce rolls 121 and 121'.

To prevent lateral displacement of the rolls when they are adjusted the threads on screw 145 are made with only one-half of the pitch of the threads on screws 144 and 157, hence both walls 135 and 136 are moved exactly the same distance with respect to projection 148 when shafts 142 and 143 are turned.

For moving bearings 134' in such a way as to maintain the elevation of the roll pass constant, these bearings are extended through the front and back of walls 135 and 136 and into grooves 162 provided in uprights 163 and 164 provided on frame 122 adjacent walls 135 and 136 respectively. The grooves in these uprights are inclined at an angle of 45° as are the top and bottom surfaces of the extending portions 134'a of bearings 134' which are engaged in them. Hence when the walls 135 and 136 are moved together to enlarge the rolls 121 and 121' bearings 134' and the axis 126' are moved downwardly an amount corresponding to the increase in radius of the rolls and similarly upward when the radius of the rolls is decreased.

To provide the necessary pressure between the rolls to insure the proper feeding, roll 121 is mounted to be moved by its engagement with roll 121′ hence being raised by bearings 134′ and lowered by gravity. To regulate the pressure between the rolls, springs 170 are arranged to bear on the tops of bearings 134 and these in turn arranged to be engaged at their upper ends by screws 165 which are extended through threaded sleeves 166 loosely mounted in the tops of walls 135 and 136. On the tops of these screws there are provided beveled gears 167 which are meshed with gears 168 mounted on shaft 142. Through this arrangement springs 170 are adjusted with the rolls when the latter are moved and consequently their pressure automatically maintained constant independently of the position of the roll setting.

As previously stated, rolls 121 and 121′ are driven by motor 3 the same as carriers 23 and 23′. To permit their adjustment they are flexibly connected to gears 21 and 22 by means of shafts 124 and 124′, which are connected to the shafts 126 and 126′ of these rolls, and the gears by universal couplings 125 and 125′. For turning the rolls they are keyed to shafts 126 and 126′ by pins 169 and 169′ which are extended through end blocks 128 and 128′ and engaged in axial slots 170 and 171′ provided in the axes, such slots permitting axial movement of the end blocks when the rolls are adjusted. To augment this driving connection driving elements 172 and 172′ are keyed to the center of shafts 126 and 126′. These elements are provided with parallel sided slots 173 equal in number to the number of segments 127 and 127′. These latter segments are cut away at their centers in the manner shown in Figs. 10, 11 and 13 to provide lugs 180 having parallel sides which engage in slots 173. Hence the drive of the roll is effectively maintained independently of the position of the end blocks 128 or the lateral positions of the segmental sections 127, and by the engagement of the lugs 180 in slots 173 of cogs 172 the segments 127 are maintained centralized and prevented from moving in a plane on an angle to the axes of shafts 126 and 126′.

For simultaneously adjusting both the radius of rotation of the cutting blades to vary the lengths of cuts and the diameter of the feed rolls to vary the speed of the feed and thereby insure accuracy in cuts, a reversible motor 175 is provided as shown in Figs. 1 and 2. This motor is connected to a shaft 176 which is mounted along the ends of the shear and roll frame in operative alignment with shaft 47′ and screw shaft 143, respectively. For operating these two latter shafts from shaft 176 two gears 177 and 178 are provided on shaft 176 and arranged to mesh with gear 179 on shaft 47′ and gear 152 on screw shaft 143. Hence an operator may operate motor 175 at his will to change the length of the cuts and at the same time automatically change the feeding speed of the stock to accord with the peripheral speed of the blades.

A further feature of the invention is the provision of means for increasing the adjustability of the combined apparatus. As will be appreciated in such a construction the blade carriers can be constructed to have a much larger margin of adjustment than the feed rolls. This is due to the fact that the rolls are limited by the radius of the segments 127. Hence to adapt the feed rolls to accommodate the full range of adjustment of the shear they must be provided with means for varying their rotary speed with respect to that of the blade carriers. Such is the purpose of the gear change unit 13 shown in Fig. 1 in the feed roll drive. To permit the use of such a gear change unit and at the same time provide synchronous adjustment of the shear and feed rolls when the speed of the two is changed by such unit, it is necessary to provide a gear change unit 181 in shaft 176 between the feed rolls and the shear whereby the adjustment of the blades will differ from that of the rolls when shaft 176 is turned an amount which will compensate for the difference in rotary speeds of the rolls and carriers to give the same peripheral speeds. This of course necessitates that the rolls be set properly with respect to the blades when gear units 13 and 181 are brought into use.

To permit such adjustment of the feed rolls independently of the blade carriers a clutch 182 is provided in shaft 176 which the operator operates when the adjustment is made.

In operating this apparatus the radius of rotation of the cutting blades and the diameters of the feed rolls are first adjusted by operating motors 175 to give the desired length of cuts. The blade rotors 36 are then set by adjustment of the rocker arm 109 on shaft 108 to place the blades in the proper cutting positions. This, of course, as previously set forth, can be done either before or after the shear is set in motion, and if the lengths of cuts to be made exceed that permissible by the maximum radius obtainable in the blade carriers, the control governed by the drum 111 may then be brought into service. In using this the rocker arm 109 is placed on the proper cam on drum 111 which will give the necessary cutting operation desired to produce a cut nearest to the length required. After such selection is made the radii of the blades and feed rolls are adjusted by motor 175 to give the exact length. As will be readily appreciated by those skilled in the art, from the foregoing there is no limit to the number of different lengths which may be cut in a shear of this character.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:—

1. A rotary shear comprising a supporting frame, a pair of rotary blade carriers mounted for vertical adjustment in said frame, and a blade support having a blade attached thereto mounted for radial adjustment in each of said carriers, said blade supports being so positioned in said carriers as to cause their associated blades to move into cutting opposition to each other each time said carriers are rotated.

2. A rotary shear comprising a supporting frame, a pair of rotatable blade carriers mounted for vertical adjustment in said frame, a blade support having an axially disposed blade attached thereto mounted for radial adjustment in each of said carriers, said blade supports being so positioned in said carriers as to cause their associated blades to move into cutting opposition to each other each time said carriers are rotated, means for radially adjusting said blade supports in said carriers to vary the lengths of cuts produced by the shear and means for vertically adjusting said carriers to compensate for the adjustments of said blade supports.

3. A rotary shear comprising a supporting frame, a pair of rotatable blade carriers mounted for vertical adjustment in said frame, a support member having a blade attached thereto mounted for radial adjustment in each of said carriers, said support members being so mounted in said carriers as to bring said blades into cutting opposition to each other each time the carriers are rotated, screw means for radially adjusting said blade supports in said carriers, other screw means for vertically adjusting said carriers in said supporting frame, and means arranged to operate both of said screw means simultaneously.

4. A rotary shear comprising a supporting frame, a pair of rotatable blade carriers mounted for vertical adjustment in said frame, a support member mounted for radial adjustment in each of said carriers, a blade support having a blade attached thereto rotatably mounted in each of said radially adjustable support members, and means for rotating said blade supports about their axes each time said carriers are rotated about their axes.

5. A rotary shear comprising a supporting frame, a pair of rotatable blade carriers mounted for vertical adjustment in said frame, a support member mounted for radial adjustment in each of said carriers, a blade support having a blade attached thereto rotatably mounted in each of said radially adjustable supports, means for rotating said blade supports about their axes as said carriers are rotated and adjusting means for varying the relative angular positions of said blade supports.

6. A rotary shear comprising a supporting frame, a pair of rotatable blade carriers mounted for vertical adjustment in said frame, a support member mounted for radial adjustment in each of said carriers, a blade support having a blade attached thereto rotatably mounted in each of said radially adjustable support members, means for rotating said blade supports about their own axes as said carriers are rotated, and means operated in synchronism with said carriers for automatically adjusting said blade supports to control the cuts produced by said blades as said carriers are rotated.

7. A rotary shear comprising a supporting frame, a pair of rotatable blade carriers mounted in said frame, screw down means for vertically adjusting the relative positions of said carriers in said frame, a support member having a blade secured thereto mounted for radial adjustment in each of said carriers, screw mechanism operable independent of the movement of said carriers for radial adjusting of each of said blade supporting members and means connected to said screw down mechanism for positively operating said blade adjusting mechanism in unison therewith.

8. A rotary shear comprising a supporting frame, a pair of rotatable blade carriers mounted in said frame, a plurality of adjustable bearings arranged to engage the axes of said carriers said bearings being mounted for vertical movement in said supporting frame, a screw supportably engaging each of said bearings and threadably engaged in said frame, means coupled to all of said screws for adjusting all of said bearings simultaneously, a blade supporting member having a blade secured thereto mounted for radial adjustment in each of said carriers, screw means threaded in said carriers and arranged to adjustably hold said blade supports in operative positions, means mounted in said carriers for operating said blade support adjusting screw means and coupled to the means employed to operate said bearing screws for operating said blade adjusting screws in unison with said bearing adjusting screws.

9. A metal shearing apparatus comprising a rotary cutter, a set of expansible feed rolls for feeding the stock to said cutter, a motor connected to positively drive both the cutter and feed rolls, means for adjusting the cutter to vary the length of the cuts and means operated by said cutter adjusting mechanism for simultaneously expansibly adjusting said feed rolls to maintain the peripheral speeds thereof the same as that of the cutter.

10. A metal shearing apparatus comprising a pair of cooperating radially adjustable rotatably mounted blades, a pair of expansible feed rolls for feeding stock between said blades, a motor connected to positively drive both said blades and said feed rolls, means for adjusting said blades to vary their radii of rotation and means operated by said blade adjusting means for simultaneously adjusting said feed rolls to maintain the relative peripheral speed of said blades and said feed rolls constant.

11. A metal shearing apparatus comprising a rotary shear consisting of a pair of vertically adjustable rotatably mounted blade carriers, a blade support having a blade secured thereto mounted for radial adjustment in each of said carriers, means for adjusting said blade supports in said carriers to vary the radii of rotation of said blades and thereby vary the length of the cuts produced by them when stock is fed through the shear at a linear speed equal to the peripheral speed of the blades, a set of expansible feed rolls for feeding stock to the shear, a single motor connected to positively drive both said rotary shear and said feed rolls and means for expansibly adjusting the feed rolls simultaneously with the shear blades to maintain the relative peripheral speed of the feed rolls and cutting blades constant.

12. A metal shearing apparatus comprising a pair of rotatable blade carriers mounted for vertical adjustment in a supporting shear frame, a pair of blade supports having cutting blades attached thereto mounted for radial adjustment in said carriers, means for vertically adjusting said carriers in said frame, means operated from said first-mentioned means for radially adjusting said blade supports in said carriers to vary their radii of rotation, a pair of expansible feed rolls mounted for vertical adjustment in a feed roll frame arranged adjacent said shear frame, means for vertically adjusting said feed rolls in said feed roll frame, means coupled to the last-mentioned means for varying the diameters of said feed rolls, means for simultaneously operating the vertically adjusting means coupled to both said blade carrier and said feed rolls and a single power shaft positively coupled to both said blade carriers and said feed rolls.

13. A metal shearing apparatus comprising a pair of rotatable blade carriers mounted for vertical adjustment in a supporting shear frame, a pair of blade supports mounted for radial adjustment in said carriers, a pair of cutter blades rotatably mounted in said blade supports, means for simultaneously adjusting said blade supports in said carriers and said carriers in said shear frame, a pair of expansible feed rolls mounted for vertical adjustment in a feed roll frame arranged adjacent said shear frame, means for simultaneously varying the diameters of said feed rolls and adjusting them in said feed roll frame, common means for simultaneously operating the adjusting means provided for both said feed rolls and said blades, and other means operative independently of said aforementioned adjusting means for rotatably adjusting said blade supports to cause said blades to miss or make cuts as said carriers are rotated.

14. A metal shearing apparatus comprising a rotary shear consisting of a pair of rotatable blade carriers mounted for vertical adjustment in a supporting frame, a pair of blade supports having blades attached thereto mounted for radial adjustment in said carriers, end means for simultaneously adjusting said carriers in said frame and said blade supports in said carriers to vary the radii of rotation of said blades, a feed roll unit consisting of a feed roll supporting frame, a pair of expansible feed rolls mounted therein, means for simultaneously varying the diameter of said rolls and vertically adjusting them in said roll frame, unitary means for operating both said shear and feed rolls, means for varying the rotary speed of said feed rolls and means for varying the relative amounts of adjustments imparted to said feed rolls and shear to compensate for variations in the relative rotary speeds of said shear and feed rolls produced by said speed varying means to maintain their relative peripheral speeds uniform.

In testimony whereof, I sign my name.

JOHANN HAHN.